Sept. 22, 1953 T. R. HUGHES 2,652,931
ARTICLE HANDLING APPARATUS
Filed June 26, 1951 6 Sheets-Sheet 1

Inventor
T. R. HUGHES
By Rule and Hoge
Attorneys

Sept. 22, 1953

T. R. HUGHES 2,652,931

ARTICLE HANDLING APPARATUS

Filed June 26, 1951

Inventor
T. R. HUGHES

By Rule & Hoge

Attorneys

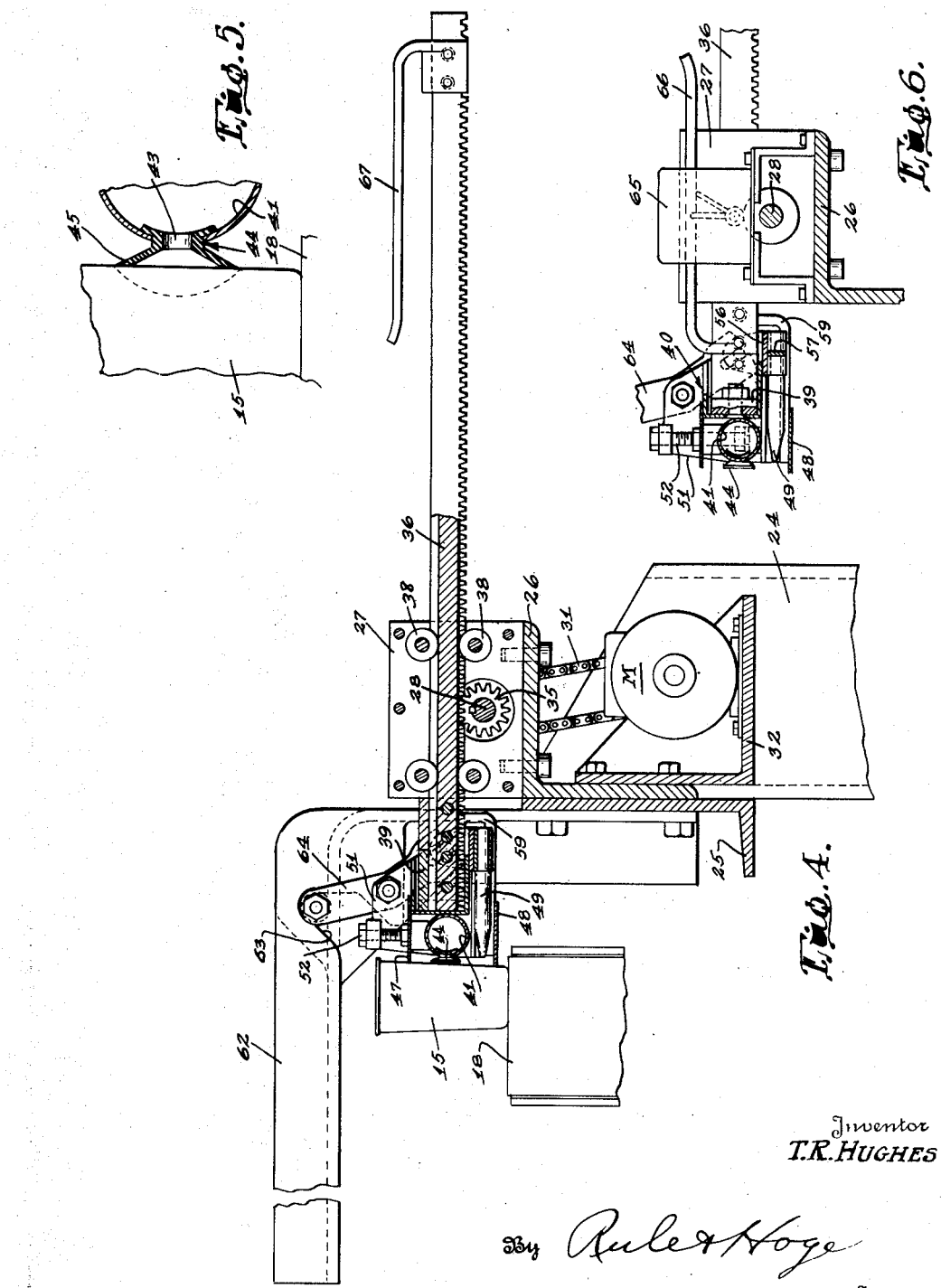

Inventor
T. R. HUGHES
By Rule and Hoge,
Attorneys

Sept. 22, 1953 T. R. HUGHES 2,652,931
ARTICLE HANDLING APPARATUS
Filed June 26, 1951 6 Sheets-Sheet 6

Inventor
T. R. HUGHES
By Rule & Hoge
Attorneys

Patented Sept. 22, 1953

2,652,931

UNITED STATES PATENT OFFICE 2,652,931

ARTICLE HANDLING APPARATUS

Tom Richard Hughes, Inglewood, Calif., assignor to Owens-Illinois Glass Company, a corporation of Ohio Application June 26, 1951, Serial No. 233,572

8 Claims. (Cl. 214—1)

This invention relates to an article handling apparatus and particularly to apparatus for transferring glass articles such as tumblers from a lehr to a single cross conveyor.

In the present day manufacture of glass articles such as tumblers, the tumblers are usually placed in parallel rows within the annealing lehr; after annealing the tumblers are transferred while in upright position to a conveyor which transports them to gauging apparatus, packing apparatus, or to positions for other operations. Considerable difficulty is encountered in transferring the tumblers from the lehr to the cross conveyor because of their instability in such upright position. In attempting to apply the usual method, wherein the containers are transferred from the lehr to the conveyor by being pushed across a stationary plate by the mass of containers bunching at the end of the lehr, the tumblers are chipped, broken, or tipped over. In addition, the process usually necessitates an additional operator.

It is therefore an object of this invention to obviate these difficulties by providing an apparatus for transferring tumblers from the lehr to the cross conveyor.

It is a further object of this invention to provide such an apparatus which will positively grip each tumbler and transfer and positively position it on the cross conveyor.

Other objects of the invention will appear hereinafter.

Basically, my invention comprises a reciprocating carriage having a series of suction cups mounted thereon. The carriage is reciprocated to move the suction cups into contact with a row of tumblers on the lehr conveyor and a vacuum is applied to the suction cups causing them to grip the tumblers. The carriage is then moved into position adjacent to the cross conveyor, the vacuum is released, and the tumblers are deposited on the cross conveyor and carried away thereby. In accordance with my invention, the entire apparatus is fully automatic, thereby eliminating any necessity for manual control or supervision thereof.

Referring to the accompanying drawings:

Fig. 4 is a part sectional view at the line 4—4 on Fig. 3;

Fig. 5 is a fragmentary part-sectional view showing a suction cup in gripping relationship with a tumbler;

Fig. 6 is a sectional view at the line 6—6 on Fig. 3;

Figure 1:
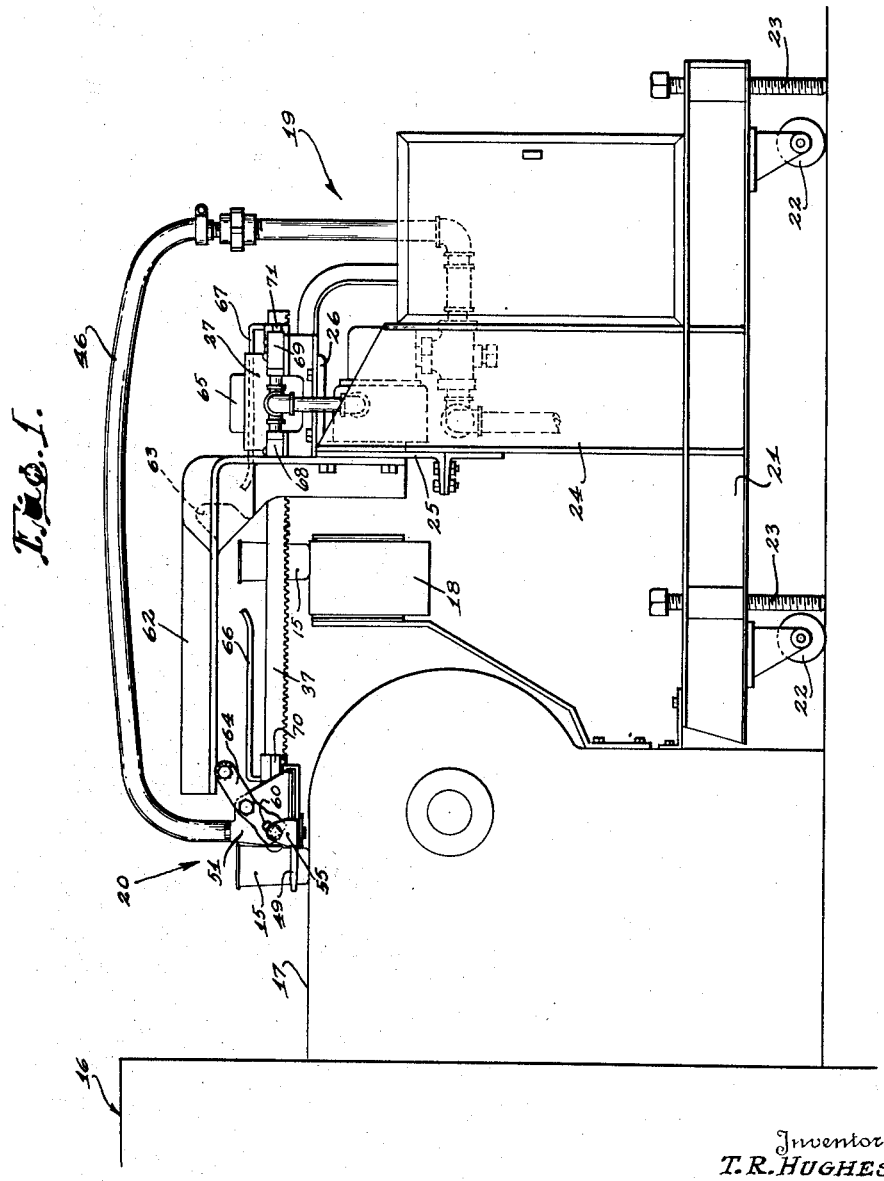
Fig. 1 is an end elevational view of the apparatus embodying my invention in position with a lehr and cross conveyor.

Referring to Fig. 1, tumblers 15 are carried through a lehr 16 in transverse parallel rows by an endless belt lehr conveyor 17. Each row of tumblers is then transferred to an endless belt cross conveyor 18 by transfer apparatus 19. The transfer apparatus 19 basically comprises a carriage 20 which is reciprocable from a position adjacent to the lehr conveyor 17 to a position adjacent the cross conveyor 18. The carriage is provided with means, presently described, for gripping the tumblers on the lehr conveyor and subsequently releasing and depositing the tumblers onto the cross conveyor. Generally, the gripping means comprises a manifold provided with a series of suction cups which grip the tumblers.

Figure 2:
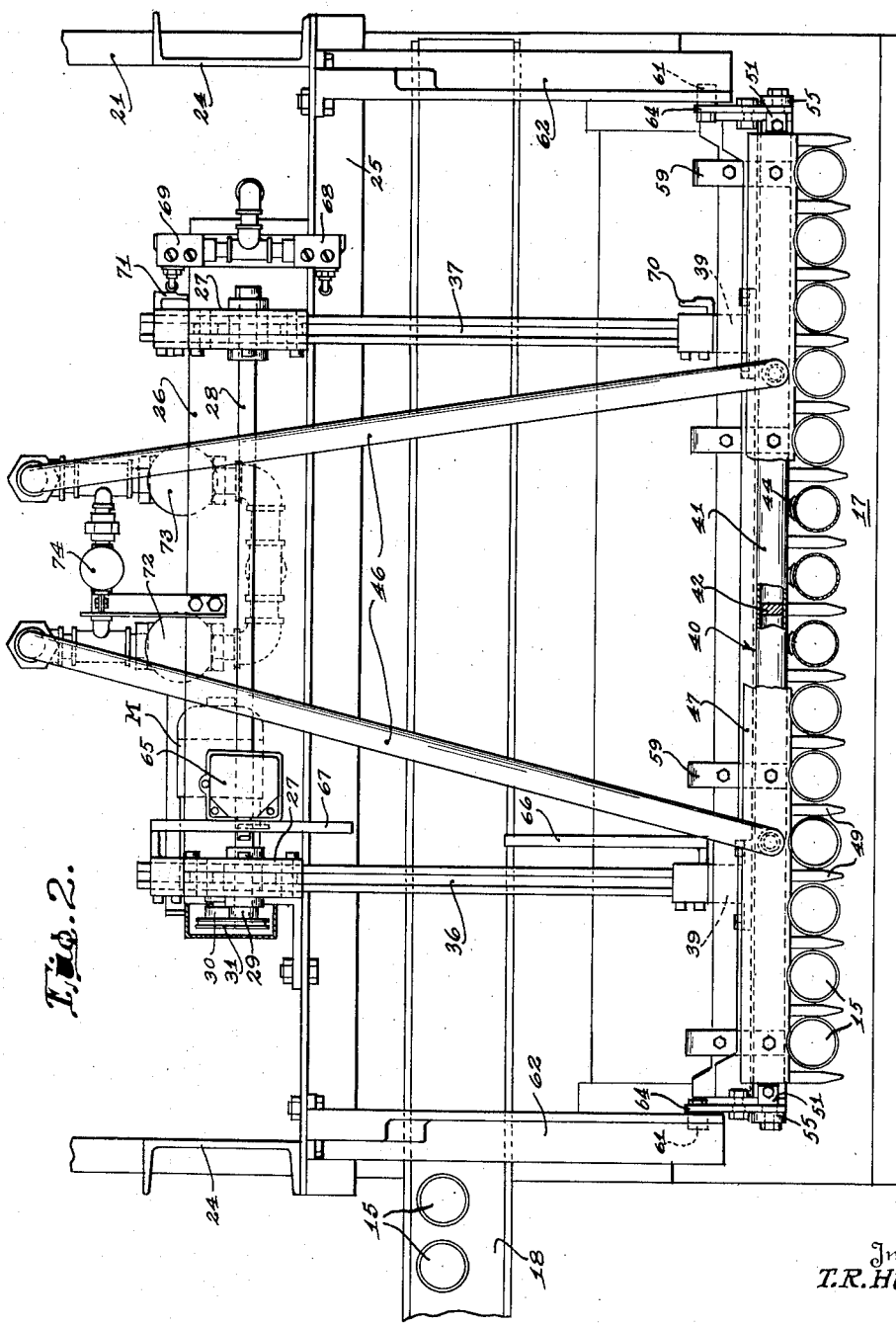
Fig. 2 is a plan view of the same.

As shown in Fig. 1, the transfer apparatus comprises a base 21 mounted on rollers 22 and provided with adjusting screws 23. Spaced parallel uprights 24 are mounted on the sides of the base and a cross plate 25 is fastened across the upper ends of the uprights. The carriage 20 is supported for reciprocating movement on the cross plate 25. More specifically, an angle plate 26 is mounted on the cross plate 25 and trunnion brackets 27 are fastened to the angle plate. A cross shaft 28 is mounted on the trunnions and has a sprocket 29 keyed thereto. The shaft is rotated by a motor M through the linkage which includes a sprocket 30, chain 31 and the sprocket 29 (Fig. 2). The motor is mounted on the apparatus by a bracket 32 (Fig. 4) fastened to the cross plate 25.

Referring to Fig. 4, pinions 35 are keyed to the cross shaft 28 and meshed with racks 36, 37. Rollers 38 are mounted on the trunnion brackets 27 and guide the racks 36 and 37 in their path.

A manifold 40 is mounted across the ends of the racks 36 and 37 by brackets 39. The manifold 40 comprises a tube or pipe 41, the ends of which are sealed and which is provided at the middle with a partition or baffle 42 (Fig. 2) thereby forming two separate sections.

The tube 41 is vertically adjustable at either end thereof as hereinafter described. The front face of the tube is provided with a series of openings spaced apart a distance equal to the distance between adjacent tumblers in each row on the lehr conveyor 17. Suction cups 44, made of impervious, resilient material, such as rubber, are mounted on the tube 41 and formed with openings 43 in register with the openings in the tube 41. As shown most clearly in Fig. 5, each suction cup 44 is provided with a flared flexible lip 45.

Figure 3:
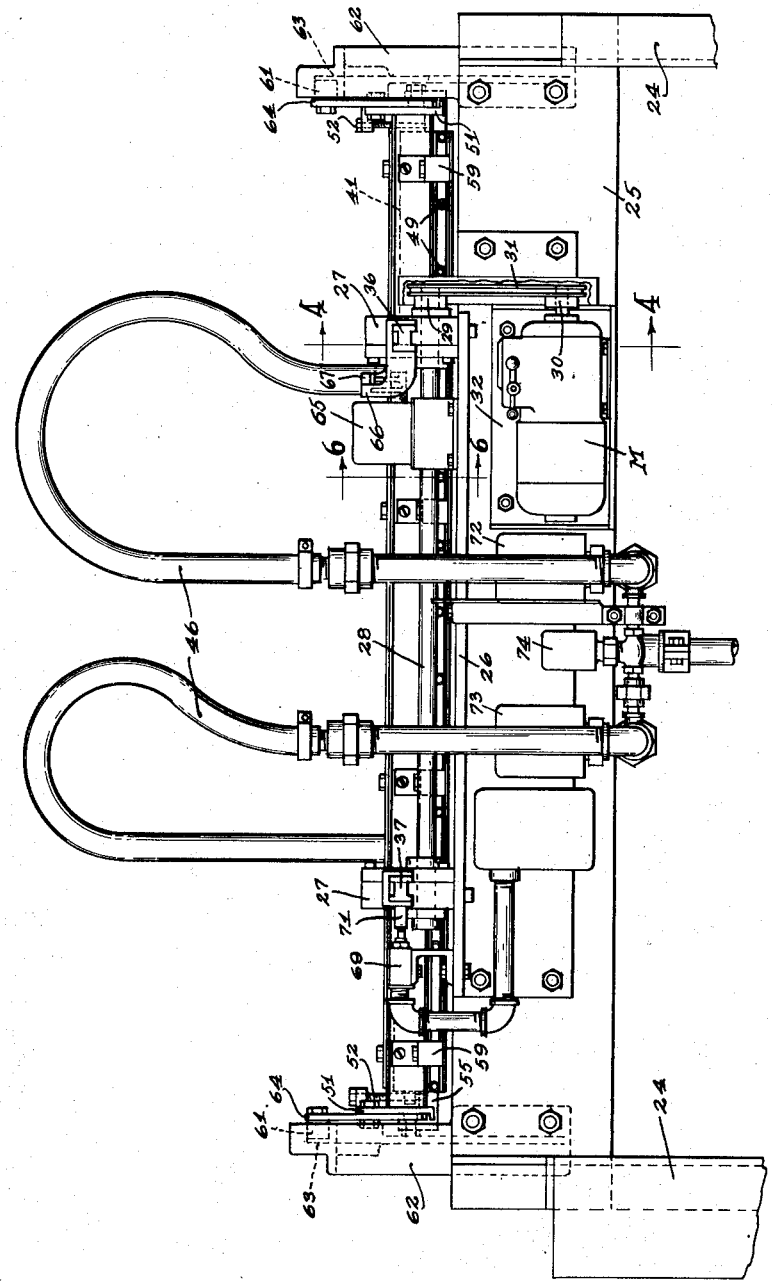
Fig. 3 is a rear elevational view of the apparatus.
Figure 7:
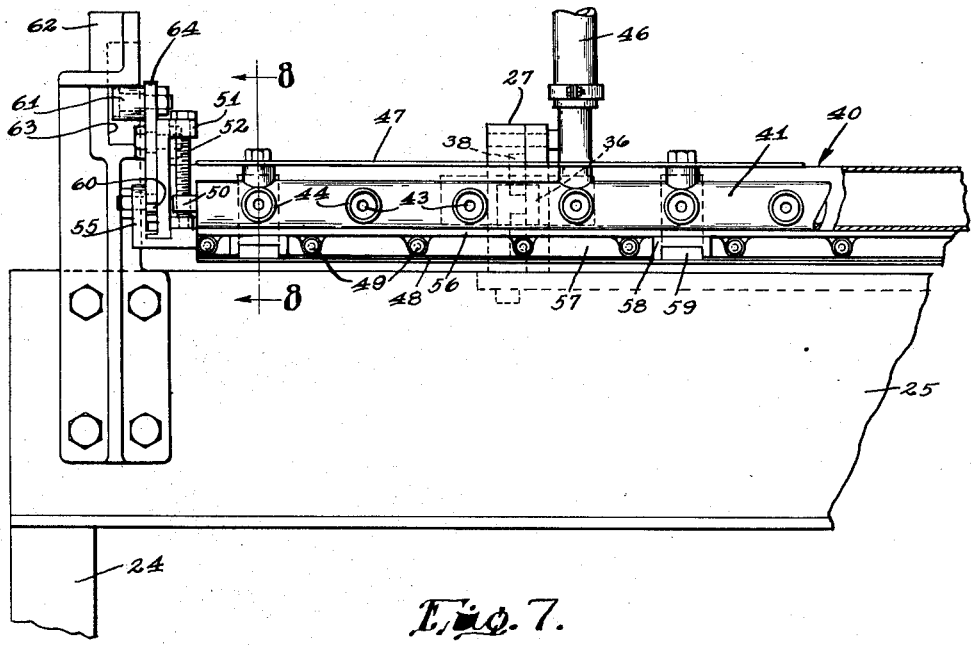
Fig. 7 is a fragmentary part-sectional view of the front of the apparatus.

Vacuum lines 46 are connected to each section of the manifold for applying a vacuum thereto and thereby causing the suction cups to grip tumblers when they are brought into contact therewith (Figs. 1, 2, and 3).

Figure 8:
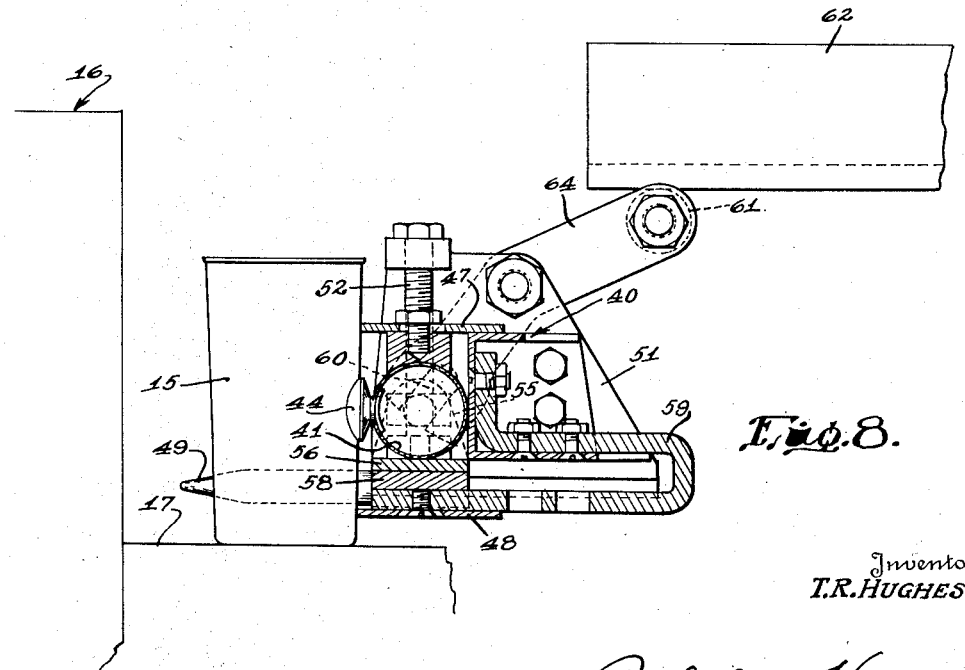
Fig. 8 is a sectional view at the line 8—8 on Fig. 7.

Thin guide plates 47 and 48 (Figs. 8 and 9) made of plastic or other material are adjustably mounted on the top and bottom of the manifold 40 to aid in guiding the tumblers into contact with the suction cups. In addition, retractable guide fingers 49 are provided on the manifold to project between the tumblers and further aid in guiding them into contact with the suctions cups.

Figure 9:
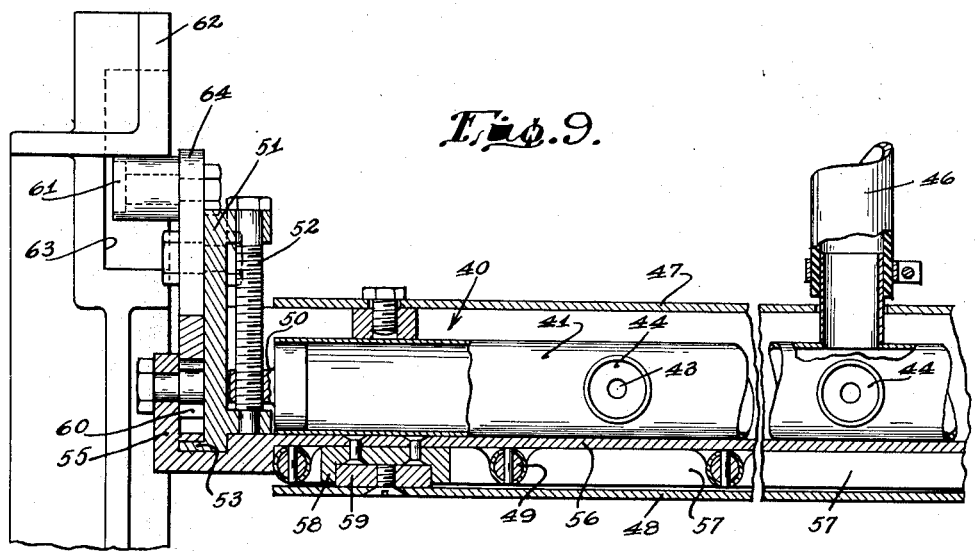
Fig. 9 is a view similar to Fig. 7, in section, and on a larger scale.

As shown in Fig. 9, the tube 41 is provided with eye brackets 50 and is mounted on vertical plates 51 by bolts 52. The bolts 52 provide a means for vertically adjusting the ends of the tube 41. As further shown in Fig. 9, the vertical plates 51 are each provided with a lip 53 at the bottom thereof. A bracket 55 is provided in engagement with the lip 53 and reciprocates relative thereto. This bracket 55 is provided with a horizontal section 56 on which are mounted the fingers 49. Spacing ribs 57 are provided between the fingers. The movement of the bracket 55 relative to the tube 41, is guided by a block structure 58, fastened to the horizontal section 56 and sliding relative to U-shaped brackets 59. The fingers 49 are thereby provided with a movement into and out of position. They can thereby be retracted to permit the tumblers to be carried away by the cross conveyor after being deposited thereon. As shown in Figs. 4, 7, 8, and 9, the plate 55 is given a positive reciprocating action by levers 64 pivotally mounted on the ends of the manifold 40 and each having a yoke 60 formed at one end thereof and a roller 61 at the other end thereof. The yoke 60 is meshed with a pin on the bracket 55. Each lever is actuated by a horizontal cam 62 which is permanently fastened to the vertical uprights 24. Each cam 62 includes a recess 63 which pivots the lever 59 when the manifold is at its rearmost position adjacent to the cross conveyor thereby retracting the fingers.

As shown in Figs. 2 and 6, means is provided for controlling the operation of the motor M and includes a double acting limit switch 65 mounted on the cross plate 26. This switch is actuated by cams 66 and 67 on either end of the rack 36. By this arrangement the power to the motor is cut off before the rack has reached the end of its travel and the rack is permitted to move or coast to the end of its travel by its momentum.

Means is also provided for controlling the application of the vacuum to the manifold and comprises solenoid valves 72 and 73 (Fig. 2) the operations of which are controlled by limit switches 68 and 69. The limit switches are actuated by cams 70 and 71 mounted on either end of the rack 37. A valve 74 (Figs. 2 and 3) is also provided to supply air under atmospheric pressure to the manifold sections after the vacuum is released in order to cause the suction cups to release the tumblers.

Figure 10:
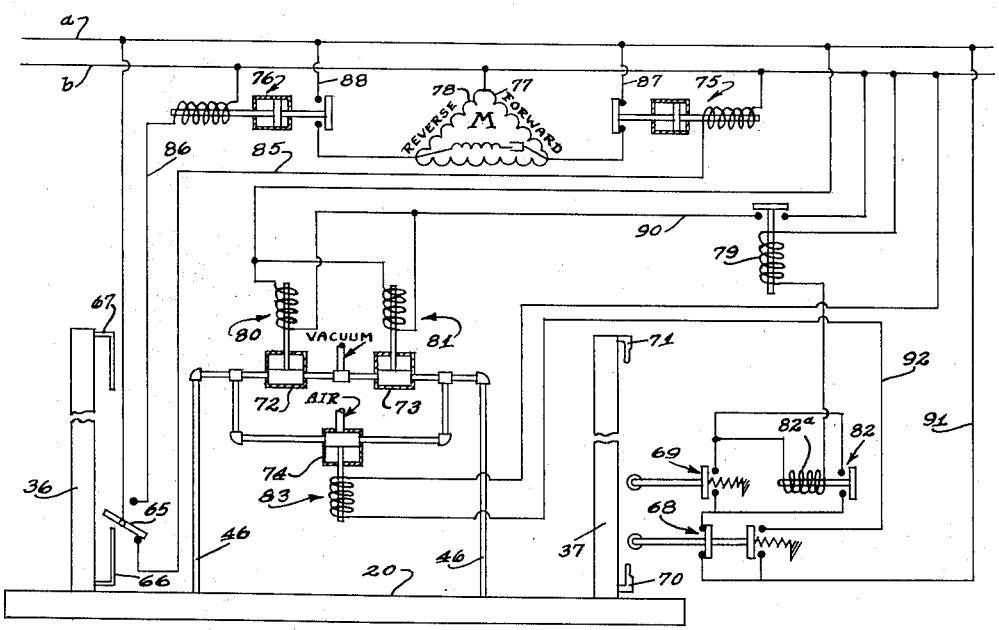
Fig. 10 is a schematic wiring diagram for the apparatus.

The wiring circuit of the apparatus is shown schematically in Fig. 10. Power is supplied to the circuit through lines a, b. As shown, the double acting switch 65 alternately completes a circuit to time delay relays 75 and 76 through wires 85 and 86, respectively. The time delay relays in turn complete circuits to the forward and reverse motor controls 77 and 78, respectively through wires 87 and 88. As further shown in Fig. 10, the switch 68 is double acting, and the switch 69 is single acting. When switch 68 is in the position shown and switch 69 is closed, the master relay 79 is energized through wire 89 completing the circuits to solenoids 80 and 81 through wire 90. The solenoids 80 and 81 in turn actuate the vacuum valves 72 and 73 to apply a vacuum to the suction cups. A holding relay 82 is provided in parallel with the switch 69 in order to maintain the circuit energized when the switch 69 is opened. When the switch 68 is in its other position, a circuit is completed to the solenoid 83 through wires 91 and 92 which actuates the atmospheric valve, thereby supplying air under atmospheric pressure to the suction cups.

The operation of the apparatus may be summarized as follows:

When the carriage is beginning its forward motion, the switch 65 is in the position shown in the wiring diagram, the time delay relay 75 being energized is completing a circuit to the forward motor control 77. The switch 68 is in the position shown and the switch 69 is open. As the carriage approaches the end of its forward travel, the cam 67 actuates the switch 65 to its second position. This cuts the power to the forward motor control 77 and completes the circuit to the time delay relay 76. The time delay relay 76 is adjusted in such a manner that the circuit to the reverse motor control 78 is not completed until the carriage reaches the end of its forward travel. The carriage is thus permitted to move to the end of its travel under its momentum.

As the carriage approaches the lehr conveyor, the tumblers are guided into position against the suction cups by the fingers 49 and the guide plates 47 and 48. Simultaneously, at the end of the carriage travel, the switch 69 is actuated by the cam 71, thereby completing a circuit through solenoid 82$^a$ of a holding relay 82 and through solenoid 79. The solenoid 79 operates to complete the circuits to the solenoids 80, and 81 of the solenoid valves 72 and 73 so that the valves operate to apply a vacuum to the suction cups 44 causing them to grip the tumblers. By this time, the time delay relay 76 has completed the circuit to the reverse motor control 78 causing the motor to operate and move the carriage rearward toward the cross conveyor. As the carriage moves away from its forward position, the switch 69 is reopened. The solenoids of the vacuum valves remain energized under the action of the holding relay 82.

As the carriage approaches the end of its rearward travel the switch 65 is actuated by the cam 66 thereby opening the circuit of the relay 76 and cutting the power to the reverse motor control, permitting the carriage to move to the end of its rearward travel by its momentum. The time delay relay 75 is also energized but is so adjusted that the circuit to the forward motor control 77 is not completed until a predetermined time interval has elapsed. Upon moving to the end of its rearward travel, the carriage causes the cam 70 to actuate the switch 68, thus opening the circuit of solenoid 79 which then breaks the circuit to the solenoids 80 and 81 of the vacuum valves 72 and 73, thereby cutting off the vacuum to the suction cups. Simultaneously, the switch 68 completes a circuit to the solenoid 83 of the valve 74, thereby admitting air under atmospheric pressure to the suction cups to insure complete dissipation of the vacuum therein and release of the tumblers onto the cross conveyor. Meanwhile the fingers 49 have been moved to a retracted position by the levers 64 and cams 62 so that the tumblers may be freely carried away by the cross conveyor. The time delay relay 75 is adjusted so that the forward motor control is not energized until the row of tumblers has been carried away by the cross conveyor.

As the carriage begins its forward movement once again, the switch 68 is actuated to its position shown in the wiring diagram and a new cycle begins.

Modifications may be resorted to within the spirit and scope of the appended claims.

I claim:

1. Article transferring apparatus comprising a carriage, a reversible motor, means operatively connecting the motor to the carriage, means for reversing the motor in order to reciprocate the carriage, said carriage comprising a manifold provided with a series of openings therein, a series of suction cups made of resilient material mounted on the manifold over said openings, means for applying a vacuum to the manifold, a solenoid valve controlling said means for applying a vacuum to the manifold, switches having a stationary mounting, one said switch being connected in circuit with the solenoid of said valve in such a manner that when the switch is actuated the valve is operated to apply a vacuum to said manifold, the other switch being connected in circuit with the said solenoid in such a manner that when the latter switch is actuated the solenoid valve is operated to cut off the vacuum to said manifold, cams individual to said switches and mounted on the carriage in position to actuate the respective switches as the carriage is reciprocated, means for cutting the power to said motor before the carriage has reached the end of its travel in either direction thereby permitting the carriage to move to the end of its travel by its momentum, said means for cutting the power to said motor comprising a double acting limit switch mounted separately from the carriage, cams on the carriage in positions to operate the limit switch in opposite directions respectively as the carriage approaches the end of its travel in opposite directions, and time delay relays actuated by the limit switch, each said relay controlling the operation of said motor in one direction only, each said relay being adjusted so that the operation of the motor is delayed until the carriage has reached the end of its travel in one direction.

2. Article transferring apparatus comprising a carriage, a reversible motor, means operatively connecting the motor to the carriage, means for reversing the motor in order to reciprocate the carriage, said carriage comprising a manifold provided with a series of openings therein, a series of suction cups made of resilient material mounted on the manifold over said openings, means for applying a vacuum to the manifold, a solenoid valve controlling the said means for applying a vacuum to the manifold, switches having a stationary mounting, one said switch being connected in circuit with the solenoid of said valve in such a manner that when the switch is actuated the valve is operated to apply a vacuum to said manifold and the other switch being connected in circuit with the said solenoid in such a manner that when the said other switch is actuated the solenoid valve is operated to cut off the vacuum to said manifold, cams individual to said switches and mounted on the carriage respectively in positions to actuate the respective switches as the carriage is reciprocated, a series of fingers mounted on said carriage and projecting in front of the manifold to guide the articles into contact with the suction cups, and means for withdrawing the fingers from said projected position when the carriage is at one end of its travel.

3. The combination comprising a horizontal endless conveyor for transporting parallel rows of glass tumblers, a second conveyor at right angles to said conveyor for transporting a single row of glass tumblers, and means for transferring a row of glass tumblers from said first conveyor to said second conveyor, said means comprising a carriage, means for reciprocating said carriage from a position adjacent the first conveyor to a position adjacent said second conveyor, said carriage comprising a manifold provided with a series of openings spaced apart a distance corresponding to the space between adjacent tumblers in each row on said first conveyor, a series of suction cups made of resilient material and mounted over said openings, means for applying a vacuum to said manifold when the carriage is in position adjacent the first conveyor thereby causing each suction cup to grip a tumbler, means for releasing the vacuum when the carriage is in position adjacent the second conveyor thereby depositing the tumblers on the second conveyor, a series of fingers mounted on said carriage and projecting in front thereof, and means for moving the fingers out of position in front of the carriage when the carriage is in position adjacent the second conveyor, in order to permit the tumblers to be carried away by the second conveyor.

4. The combination of a horizontally traveling endless conveyor for transporting articles arranged in parallel rows thereon, said rows extending transversely of the direction of travel of the conveyor, a second traveling conveyor extending and traveling in a direction at right angles to that of the first conveyor, means for transferring the said rows of articles in succession from the first to the second conveyor, said means comprising a carriage mounted for reciprocating movement in the direction of travel of said first conveyor, said carriage including a manifold extending parallel with said rows of articles and provided with suction cups at intervals therealong, means for reciprocating the carriage and thereby bringing the manifold to a pick-up position at which the suction cups engage the articles comprising the foremost row on said first conveyor, a series of guiding fingers mounted on the carriage and projecting forwardly beyond the suction cups into position to guide the said articles to the suction cups, means for applying suction to the manifold and thereby causing the cups to grip said articles while at the pick-up position and carry the articles to a releasing position over the second conveyor, means for retracting said fingers into a position to clear the said articles for traveling movement with said second conveyor, and means for then releasing the articles from the cups to the said second conveyor.

5. The combination with a horizontally traveling conveyor and a support for supporting a row of articles in position spaced from the conveyor, of apparatus for transferring the row of articles and placing them on the conveyor with said row extending in the direction of travel of the conveyor, said apparatus comprising a carriage, a row of article gripping devices on the carriage and spaced to correspond with the spacing of the articles in said row, power mechanism for reciprocating the carriage between an article gripping position in which the gripping devices are in contact with the upright sides of said articles and an article releasing position in which the articles are over the conveyor, means for causing the gripping devices to grip the articles and hold them during their transfer to the conveyor, article supporting fingers on the carriage in position to project forwardly between the articles for guiding them and holding them in upright position as the grippng devices are moving into contact with the articles, and automatic means for retracting said fingers when the row of articles is moved onto the conveyor and thereby permitting the articles to advance with the traveling conveyor.

6. The combination set forth in claim 5, said gripping devices comprising suction cups and means for vacuumizing the cups when brought into contact with the articles, and means for dissipating the vacuum and thereby releasing the cups from the articles when the latter are positioned on the conveyor.

7. The combination set forth in claim 5, the row of articles on said support being parallel with the direction of travel of said conveyor, and means for supporting and guiding the carriage horizontally in a single direction substantially perpendicular to the direction of movement of the conveyor throughout the transfer of the articles.

8. The combination set forth in claim 6, the means for withdrawing the said guiding fingers comprising a carrier mounted on the carriage and extending transversely of the direction of movement of the carriage, and means for automatically withdrawing the carrier and said fingers away from the articles while the latter are held by the said gripping devices.

TOM RICHARD HUGHES.

References Cited in the file of this patent
UNITED STATES PATENTS

| Number | Name | Date |
| --- | --- | --- |
| 1,105,510 | Hansell | July 28, 1914 |
| 1,567,725 | Freese | Dec. 29, 1925 |
| 1,867,389 | Sylvester | July 12, 1932 |
| 2,001,332 | Ross | May 14, 1935 |
| 2,224,975 | McNamara | Dec. 17, 1940 |
| 2,445,884 | MacManus | July 27, 1948 |
| 2,524,846 | Socke et al. | Oct. 10, 1950 |
| 2,546,838 | Tasche | Mar. 27, 1951 |